UNITED STATES PATENT OFFICE.

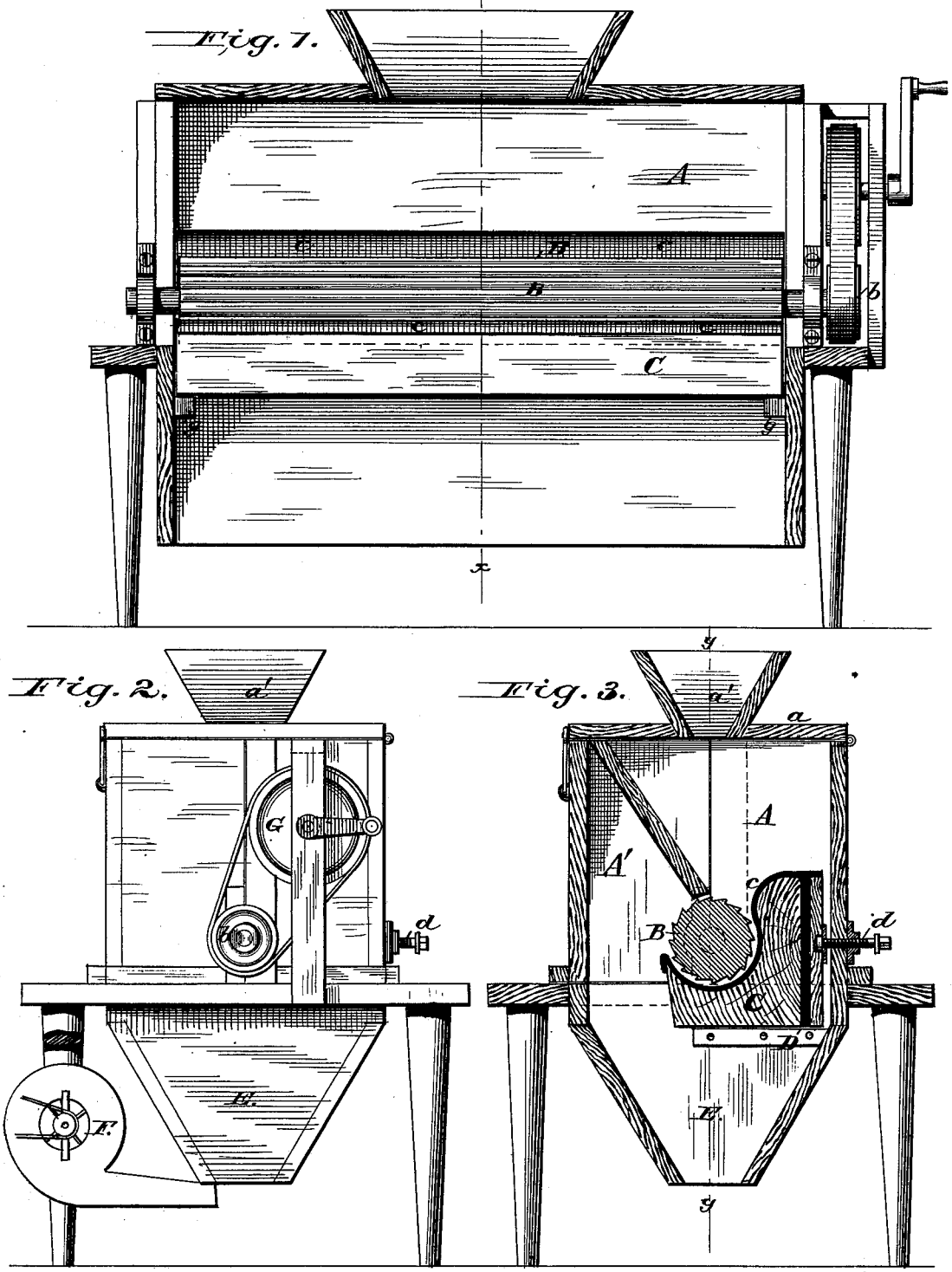

CHARLES B. BROWN, OF GEORGETOWN, DISTRICT OF COLUMBIA.

IMPROVEMENT IN COFFEE AND RICE HULLERS.

Specification forming part of Letters Patent No. 220,698, dated October 21, 1879; application filed February 7, 1879.

*To all whom it may concern:*

Be it known that I, CHARLES B. BROWN, of Georgetown, in the county of Washington and District of Columbia, have invented certain new and useful Improvements in Coffee and Rice Hullers; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

This invention relates to an improvement in machines for hulling coffee, rice, &c., whereby the material is thoroughly hulled without breaking the berry or grain.

In the drawings, Figure 1 is a longitudinal section; Fig. 2, an end view of the machine. Fig. 3 is a section on line $x\ x$ of Fig. 1.

A A' represent a sectional case or cover on the machine. $a'$ is a hopper on top of machine. B is a cylinder having longitudinal furrows arranged upon its periphery; $b$, pulley on end of cylinder-shaft, by means of which motion is imparted to the cylinder.

C represents an adjustable bed to the cylinder B. $c$ is an elastic facing on adjustable bed; D, elastic packing or spring on adjustable bed; $d$, set-screw for regulating the space between adjustable bed and cylinder B. E is a hopper at the bottom of machine. F is a fan; G, main driving-pulley. $g\ g$ are guides upon which adjustable bed C rests.

The operation of the machine is as follows: The material to be hulled is fed into the hopper $a'$ at the top of the machine. It then falls onto the surface of the cylinder B, and is conveyed by the furrows to and brought in contact with the elastic surface of the bed C, when, owing to the cylinder revolving, the elastic surface offers resistance to the grain or berry sufficient to allow the shoulder of the furrow to strip the hull from the material, and it then passes on and out of the bed, and falls into the hopper E at the bottom of the machine, where it is subjected to a current of air from a fan, F, which separates the hullings from the berry or grain.

Should the space between the cylinder B and the bed C not be large enough to admit of the larger grains or berries passing through it, the elastic packing or spring D will allow the bed itself to accommodate itself at any point sufficient to operate perfectly.

Various means have been resorted to for the purpose of hulling coffee, rice, &c.; but in most cases the material is greatly broken in the process of hulling; but in the use of my invention I am enabled to thoroughly and effectually hull coffee, rice, &c., without breaking the grain or berry.

Having described my invention, what I claim as new, and desire to secure by Letters Patent, is—

1. In a machine for hulling coffee or rice, the combination of a horizontal cylinder having longitudinal furrows upon its periphery and an adjustable bed having a continuous elastic facing, substantially as and for the purpose set forth.

2. In a machine for hulling coffee or rice, the combination of a horizontal cylinder having longitudinal furrows upon its periphery, an adjustable bed having a continuous elastic facing, and an elastic cushion or spring to said adjustable bed, substantially as and for the purpose set forth.

3. In a machine for hulling rice or coffee, the combination of a horizontal cylinder having longitudinal furrows upon its periphery, an adjustable bed to said cylinder having a continuous elastic facing, and an elastic cushion or spring attached to said adjustable bed, and a fan for separating the hulled material, substantially as and for the purpose set forth.

In testimony that I claim the foregoing as my own I affix my signature in presence of two witnesses.

CHARLES B. BROWN.

Witnesses:
ED. SHOEMAKER,
C. W. SHOEMAKER.